United States Patent
Chen et al.

(10) Patent No.: US 12,352,909 B2
(45) Date of Patent: Jul. 8, 2025

(54) DETECTION DEVICE

(71) Applicant: InnoCare Optoelectronics Corporation, Tainan (TW)

(72) Inventors: Pin-Chung Chen, Tainan (TW); Chin-Chi Chen, Tainan (TW)

(73) Assignee: InnoCare Optoelectronics Corporation, Tainan (TW)

( * ) Notice: Subject to any disclaimer, the term of this patent is extended or adjusted under 35 U.S.C. 154(b) by 338 days.

(21) Appl. No.: 18/186,214

(22) Filed: Mar. 20, 2023

(65) Prior Publication Data

US 2023/0333266 A1    Oct. 19, 2023

(30) Foreign Application Priority Data

Apr. 19, 2022   (CN) .......................... 202210409806.0

(51) Int. Cl.
   *G01T 1/20*      (2006.01)

(52) U.S. Cl.
   CPC .................................. *G01T 1/2018* (2013.01)

(58) Field of Classification Search
   CPC ..... G01T 1/2018; G01T 1/20184; G01T 1/20; G01T 7/00; G01T 1/24; H10F 39/8037; H10F 39/189
   See application file for complete search history.

(56) References Cited

U.S. PATENT DOCUMENTS

| | | | |
|---|---|---|---|
| 8,344,329 B2 | 1/2013 | Imai | |
| 8,785,994 B2 * | 7/2014 | Kim | ..................... G01T 1/20183 |
| | | | 257/E31.115 |
| 2019/0196031 A1 * | 6/2019 | Jung | ....................... G01T 1/247 |

FOREIGN PATENT DOCUMENTS

| | | |
|---|---|---|
| TW | 201602619 | 1/2016 |
| TW | 202109863 | 3/2021 |

OTHER PUBLICATIONS

"Office Action of Taiwan Counterpart Application", issued on Jun. 2, 2023, p. 1-p. 6.

* cited by examiner

*Primary Examiner* — Edwin C Gunberg
*Assistant Examiner* — Richard O Toohey
(74) *Attorney, Agent, or Firm* — JCIPRNET

(57) ABSTRACT

A detection device, including a substrate, a gate line, a gate line driving circuit, and a photoelectric element, is provided. The substrate includes a detection area and a peripheral area surrounding the detection area. The gate line is disposed on the substrate and extends from the detection area to the peripheral area. The gate line driving circuit is disposed in the peripheral area of the substrate and includes a first transistor and a second transistor. The first transistor is coupled to a first clock signal and the gate line. The second transistor is coupled to a second clock signal and the first transistor. The photoelectric element is disposed in the detection area and is coupled to the gate line. A distance between the second transistor and the detection area is less than a distance between the first transistor and the detection area.

20 Claims, 5 Drawing Sheets

DETECTION DEVICE

CROSS-REFERENCE TO RELATED APPLICATION

This application claims the priority benefit of China application serial no. 202210409806.0, filed on Apr. 19, 2022. The entirety of the above-mentioned patent application is hereby incorporated by reference herein and made a part of this specification.

BACKGROUND

Technical Field

The disclosure relates to a device, and in particular to a detection device.

Description of Related Art

For the general X-ray detector, after the transistor disposed in the X-ray detector for high-speed switching operates for a long time, the threshold voltage of the transistor is prone to the voltage offset phenomenon, such that the detection signal generated by the X-ray detector is correspondingly prone to abnormality, which causes the X-ray detector to be unable to provide an effective and/or correct light detection function.

SUMMARY

The disclosure provides a detection device, which can implement an optimal detection function.

According to an embodiment of the disclosure, a detection device of the disclosure includes a substrate, a gate line, a gate line driving circuit, and a photoelectric element. The substrate includes a detection area and a peripheral area around the detection area. The gate line is disposed on the substrate and extends from the detection area to the peripheral area. The gate line driving circuit is disposed in the peripheral area of the substrate and includes a first transistor and a second transistor. The first transistor is coupled to a first clock signal and the gate line. The second transistor is coupled to a second clock signal and the first transistor. The photoelectric element is disposed in the detection area and is coupled to the gate line. A distance between the second transistor and the detection area is less than a distance between the first transistor and the detection area.

Based on the above, the detection device of the disclosure can effectively improve or overcome the voltage offset effect of the transistor disposed in the detection device to implement the optimal detection function.

In order for the features and advantages of the disclosure to be more comprehensible, the following specific embodiments are described in detail in conjunction with the drawings.

DETAILED DESCRIPTION OF DISCLOSED EMBODIMENTS

Figure 1:
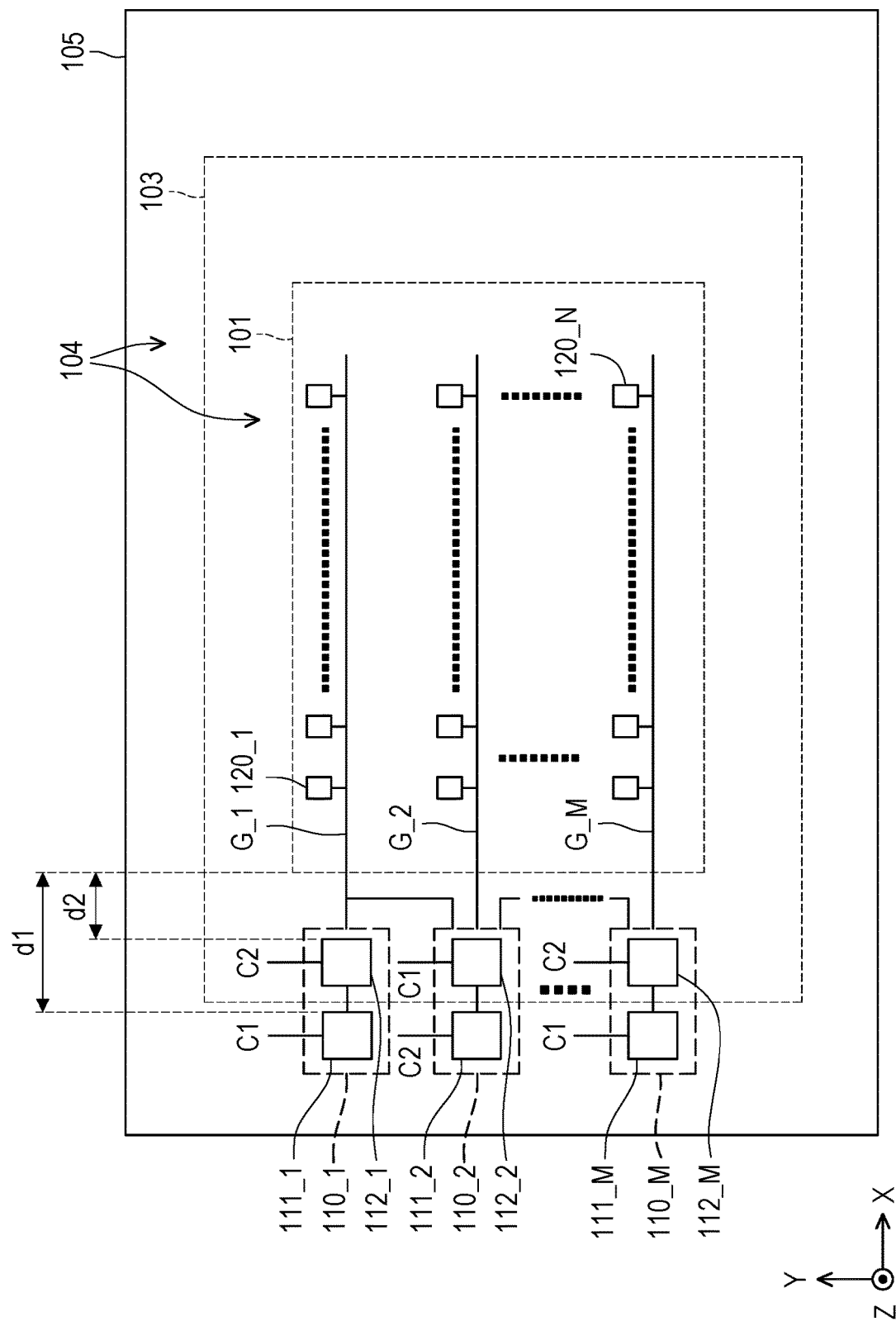
FIG. 1 is a schematic diagram of a detection device according to an embodiment of the disclosure.

Reference will now be made in detail to the exemplary embodiments of the disclosure, examples of which are illustrated in the drawings. Wherever possible, the same reference numerals are used in the drawings and the description to refer to the same or similar parts.

Throughout the specification and the appended claims of the disclosure, certain terms are used to refer to specific elements. It should be understood by persons skilled in the art that electronic device manufacturers may refer to the same component by different names. The disclosure does not intend to distinguish between components with the same function but different names. In the following specification and claims, words such as "containing" and "comprising" are open-ended words, so the words should be interpreted as "including but not limited to . . . ".

Directional terms, such as "upper", "lower", "front", "rear", "left", and "right", mentioned in the disclosure are only directions with reference to the drawings. Therefore, the used directional terms are used to illustrate, but not to limit, the disclosure. In the drawings, each drawing illustrates the general characteristics of a method, a structure, and/or a material used in a specific embodiment. However, the drawings should not be construed to define or limit the scope or nature covered by the embodiments. For example, the relative sizes, thicknesses, and positions of various film layers, regions, and/or structures may be reduced or enlarged for clarity.

In some embodiments of the disclosure, terms related to bonding and connection, such as "connection" and "interconnection", unless otherwise defined, may mean that two structures are in direct contact or may also mean that two structures are not in direct contact, wherein there is another structure disposed between the two structures. Also, the terms related to bonding and connection may also include the case where the two structures are both movable or the two structures are both fixed. Furthermore, the term "coupling" includes any direct or indirect means of electrical connection. In the case of direct electrical connection, end points of elements on two circuits are directly connected or connected to each other by a conductor segment, while in the case of indirect electrical connection, there is a switch, a diode, a capacitor, an inductor, a resistor, other suitable elements, or a combination of the above elements between the end points of the elements on the two circuits, but not limited thereto.

The terms "about", "equal to", "equivalent" or "same", "substantially", or "roughly" are generally interpreted as within 20% of a given value or range, or interpreted as within 10%, 5%, 3%, 2%, 1%, or 0.5% of the given value or range.

In the disclosure, the measurement manner of thickness, length, and width may adopt an optical microscope (OM), and the thickness or the width may be obtained by measuring a cross-sectional image in an electron microscope, but not limited thereto. In addition, there may be a certain error between any two values or directions for comparison. Furthermore, the term "a given range is from a first value to a second value" or "a given range is within a range from a first value to a second value" means that the given range includes the first value, the second value, and other values in between. If a first direction is perpendicular to a second direction, an angle between the first direction and the second direction may be between 80 degrees and 100 degrees; and if the first direction is parallel to the second direction, the angle between the first direction and the second direction may be between 0 degrees and 10 degrees.

Ordinal numbers such as "first" and "second" used in the specification and the claims are used to modify elements, and the terms do not imply and represent that the component(s) have any previous ordinal number, nor do they represent the order of a certain element and another element or the order of a manufacturing method. The use of the ordinal numbers is only used to clearly distinguish between an element with a certain name and another element with the same name. The claims and the specification may not use the same terms, whereby a first member in the specification may be a second member in the claims. It should be noted that in the following embodiments, the technical features of several different embodiments may be replaced, reorganized, and mixed to complete other embodiments without departing from the spirit of the disclosure.

It should be noted that in the following embodiments, the features of several different embodiments may be replaced, recombined, and mixed to complete other embodiments without departing from the spirit of the disclosure. As long as the features of the embodiments do not violate the spirit of the disclosure or conflict with each other, the features may be arbitrarily mixed and matched for use.

Unless otherwise defined, all terms (including technical and scientific terms) used herein have the same meaning as commonly understood by persons skilled in the art to which the disclosure belongs. It can be understood that the terms, such as the terms defined in commonly used dictionaries, should be interpreted as having meanings consistent with the related art and the background or the context of the disclosure, and should not be interpreted in an idealized or overly formal manner, unless otherwise defined in the embodiments of the disclosure.

In the disclosure, an electronic device may include a display device, a backlight device, an antenna device, a sensing/detection device, or a splicing device, but not limited thereto. The electronic device may be a bendable or flexible electronic device. The display device may be a non-self-luminous display device or a self-luminous display device. The antenna device may be a liquid crystal antenna device or a non-liquid crystal antenna device. The sensing/detection device may be a device for sensing capacitance, light, heat energy, or ultrasonic waves, but not limited thereto. In the disclosure, the electronic device may include an electronic element. The electronic element may include a passive element and an active element, such as a capacitor, a resistor, an inductor, a diode, and a transistor. The diode may include a light emitting diode or a photodiode. The light emitting diode may include, for example, an organic light emitting diode (OLED), a mini LED, a micro LED, or a quantum dot LED, but not limited thereto. The splicing device may be, for example, a display splicing device or an antenna splicing device, but not limited thereto. It should be noted that the electronic device may be any arrangement or combination of the above, but not limited thereto. Hereinafter, the detection device will be used as the electronic device or the splicing device to illustrate the disclosure, but the disclosure is not limited thereto.

FIG. 1 is a schematic diagram of a detection device according to an embodiment of the disclosure. Referring to FIG. 1, a detection device 100 includes gate lines G_1 to G_M, gate line driving circuits 110_1 to 110_M, photoelectric elements 120_1 to 120_N, and a substrate 105, where M and N are respectively positive integers. The detection device 100 may be an X-ray detector, but not limited thereto. Viewing from the top view direction of the detection device 100 (for example, a direction Z, wherein the substrate 105 of the detection device 100 is parallel to a plane formed along a direction X and a direction Y, and the direction X, the direction Y, and the direction Z intersect each other, for example, the direction X, the direction Y, and the direction Z are perpendicular to each other), the substrate 105 includes a detection area 101 (also referred to as an active area (AA)) and a peripheral area 104. The peripheral area 104 surrounds the detection area 101. The detection area 101 means that the photoelectric element in the area can transmit the detected signal strength to the outside of the detection device 100 in the form of an electrical signal through an active element (not shown in the drawing), such as providing the electrical signal to other electronic devices for interpretation, but not limited thereto. In addition, when the detection device 100 is an X-ray detector, the substrate 105 may also include an X-ray irradiation area 103. Viewing from the direction Z, the range of the X-ray irradiation area 103 covers the range of the detection area 101. In other words, the area of the X-ray irradiation area 103 is greater than the detection area 101. The X-ray irradiation area 103 includes the detection area 101 and a part of the peripheral area 104 adjacent to the detection area 101. The peripheral area 104 is the region from the edge of the substrate 105 to the edge of the detection area 101.

In the embodiment, the gate lines G_1 to G_M are disposed on the substrate 105 and extend from the detection area 101 to the peripheral area 104. The gate line driving circuits 110_1 to 110_M are disposed in the peripheral area 104 of the substrate 105 and respectively include first transistors 111_1 to 111_M and second transistors 112_1 to 112_M. For example, the gate line driving circuit 110_1 includes the first transistor 111_1 and the second transistor 112_1, the gate line driving circuit 110_2 includes the first transistor 111_2 and the second transistor 112_2, and so on. The gate line driving circuits 110_1 to 110_M may be disposed in the peripheral area 104 corresponding to a side of the detection area 101, but the disclosure is not limited thereto. In the embodiment, the gate line driving circuit 110_1 is coupled to the gate line G_1 and is coupled to the gate line driving circuit 110_2. The gate line driving circuit 110_2 is coupled to the gate line G_2 and is coupled to the gate line driving circuit 110_3. By analogy, the gate line driving circuit 110_(M−1) is coupled to the gate line G_(M−1) and is coupled to the gate line driving circuit 110_M. The gate line driving circuit 110_M is coupled to the gate line G_M. In another embodiment, in addition to disposing the gate line driving circuit in the peripheral area 104 on a side of the detection area 101, the gate line driving circuit may also be disposed in the peripheral area 104 on the opposite side of the detection area 101 at the same time. The transistor may include a gate and a semiconductor. The semiconductor may include a drain area, a source area, and a channel area. The channel area is disposed between the drain area and the source area. In addition, a drain electrode and a source electrode may be respectively coupled to the drain area and the source area of the semiconductor.

In the embodiment, the first transistors 111_1 to 111_M in the gate line driving circuits 110_1 to 110_M are respectively coupled to the corresponding gate lines. For example, the first transistor 111_1 of the gate line driving circuit 110_1 is coupled to the gate line G_1. The first transistor 111_2 of the gate line driving circuit 110_2 is coupled to the gate line G_2. By analogy, the first transistor 111_M of the gate line driving circuit 110_M is coupled to the gate line G_M. In the embodiment, the gate line driving circuits 110_1 to 110_M are respectively coupled to a first clock signal C1 and a second clock signal C2. The first transistors 111_1 to 111_M are respectively coupled to the corresponding second transistors 112_1 to 112_M. In the embodiment, the first transistor 111_1 of the gate line driving circuit 110_1 is coupled to the first clock signal C1, and the second transistor 112_1 is coupled to the second clock signal C2. The first transistor 111_2 of the gate line driving circuit 110_2 is coupled to the second clock signal C2, and the second transistor 112_2 is coupled to the first clock signal C1. By analogy, the first transistor 111_M of the gate line driving circuit 110_M is coupled to the first clock signal C1, and the second transistor 112_M is coupled to the second clock signal C2. In other words, the first transistors of the gate line driving circuits in the odd rows may be coupled to the first clock signal C1, and the second transistors may be coupled to the second clock signal C2. The first transistors of the gate line driving circuits in even rows may be coupled to the second clock signal C2, and the second transistors may be coupled to the first clock signal C1. The second transistors are all coupled to the first transistors regardless of whether the gate line driving circuits are in the odd rows or the even rows. The photoelectric elements 120_1 to 120_N are disposed in the detection area 101. The gate line G_1 is coupled to multiple photoelectric elements. The gate line G_2 is coupled to multiple photoelectric elements. By analogy, the gate line G_M is coupled to multiple photoelectric elements.

In the embodiment, viewing from the top view direction (that is, the direction Z) of the detection device 100, a distance d2 respectively between the second transistors 112_1 to 112_M and the detection area 101 is less than a distance d1 between the first transistors 111_1 to 111_M and the detection area 101. Taking the gate line driving circuit 110_1 as an example, the distance d1 and the distance d2 refer to the shortest distances from the detection area 101 measured in the direction (that is, the direction X) in which the respective semiconductors of the first transistor 111_1 and the second transistor 112_1 extend along the gate line G_1. In the embodiment, the first transistors 111_1 to 111_M are respectively disposed in the peripheral area 104 outside the X-ray irradiation area 103, and the second transistors 112_1 to 112_M are respectively disposed in the X-ray irradiation area 103 outside the detection area 101.

In the embodiment, the photoelectric elements 120_1 to 120_N may be arranged in an array in the detection area 101, but not limited thereto. The photoelectric elements 120_1 to 120_N may respectively include photodiodes, but not limited thereto. The gate line driving circuits 110_1 to 110_M are respectively coupled to the photoelectric elements 120_1 to 120_N through the gate lines G_1 to G_M. In the embodiment, the gate line driving circuits 110_1 to 110_M are respectively coupled to multiple photoelectric elements in different rows of the photoelectric elements 120_1 to 120_N through the gate lines G_1 to G_M. The gate line driving circuits 110_1 to 110_M may drive the photoelectric elements 120_1 to 120_N through the gate lines G_1 to G_M to perform a light detection function. In the embodiment, the semiconductors of the first transistors 111_1 to 111_M and the second transistors 112_1 to 112_M may each include silicon (Si) or metal oxide, such as an amorphous silicon (a-Si) semiconductor, a polycrystalline silicon (p-Si) semiconductor, or an indium gallium zinc oxide (IGZO) semiconductor, but not limited thereto. The materials of the semiconductors of the first transistors 111_1 to 111_M and the second transistors 112_1 to 112_M may be the same or different. In addition, the first transistors 111_1 to 111_M and the second transistors 112_1 to 112_M may be disposed on the substrate 105 with gate on array (GOA) technology, but not limited thereto.

It is worth noting that since the second transistors 112_1 to 112_M in different rows may receive the first clock signal C1 or the second clock signal C2 and the number of times and/or the time the second transistors 112_1 to 112_M are driven are higher than the first transistors 111_1 to 111_M in the same row, the second transistors 112_1 to 112_M of the embodiment are disposed in the X-ray irradiation area 103, so that the second transistors 112_1 to 112_M are irradiated via X-rays, causing the threshold voltage of the second transistors 112_1 to 112_M to generate, for example, a negative bias phenomenon, so as to improve the offset of the threshold voltage of the second transistors 112_1 to 112_M.

Figure 2:
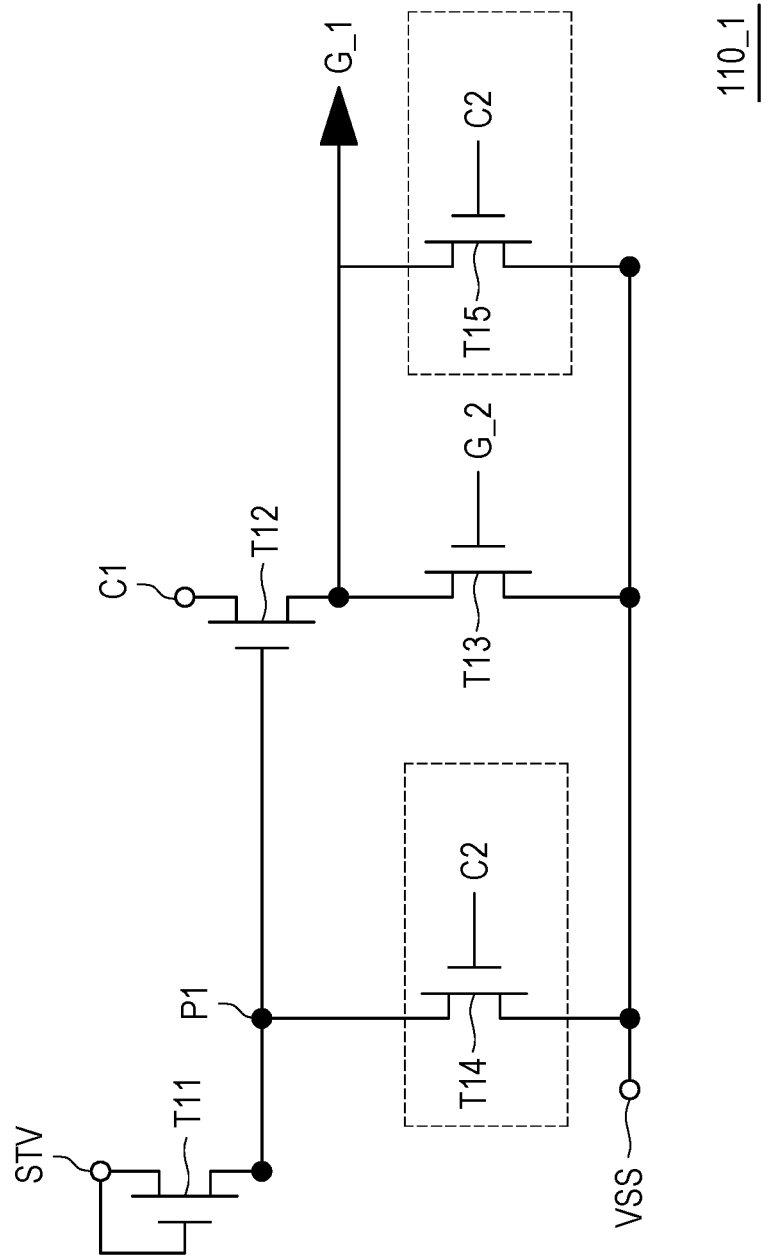
FIG. 2 is a circuit diagram of a first gate line driving circuit according to an embodiment of the disclosure.

FIG. 2 is a circuit diagram of a first gate line driving circuit according to an embodiment of the disclosure. Referring to FIG. 1 and FIG. 2, the gate line driving circuit 110_1 of FIG. 1 may include the circuit architecture as shown in FIG. 2, but not limited thereto. The gate line driving circuit 110_1 includes transistors T11 to T15. In the embodiment, a first terminal of the transistor T11 is coupled to a start signal STV and a control terminal of the transistor T11. A second terminal of the transistor T11 is coupled to a node P1. A first terminal of the transistor T12 (which may be used as the first transistor 111_1 of FIG. 1) is coupled to the first clock signal C1. A control terminal of the transistor T12 is coupled to the node P1. A second terminal of the transistor T12 is coupled to the gate line G_1 and a first terminal of the transistor T13. A control terminal of the transistor T13 is coupled to the gate line G_2 to receive an output result of the gate line driving circuit in the next row. A second terminal of the transistor T13 is coupled to a first voltage VSS (for example, a ground voltage). A first terminal of the transistor T14 (which may be used as the second transistor 112_1 of FIG. 1) is coupled to the node P1. A control terminal of the transistor T14 is coupled to the second clock signal C2. A second terminal of the transistor T14 is coupled to the first voltage VSS. A first terminal of the transistor T15 (which may be used as the second transistor 112_1 of FIG. 1) is coupled to a second terminal of the transistor T12 and the gate line G_1. A control terminal of the transistor T15 is coupled to the second clock signal C2. A second terminal of the transistor T15 is coupled to the first voltage VSS. In an embodiment, the gate line driving circuit 110_1 may only include one of the transistor T14 and the transistor T15, which is not limited to that shown in FIG. 2.

Figure 3:
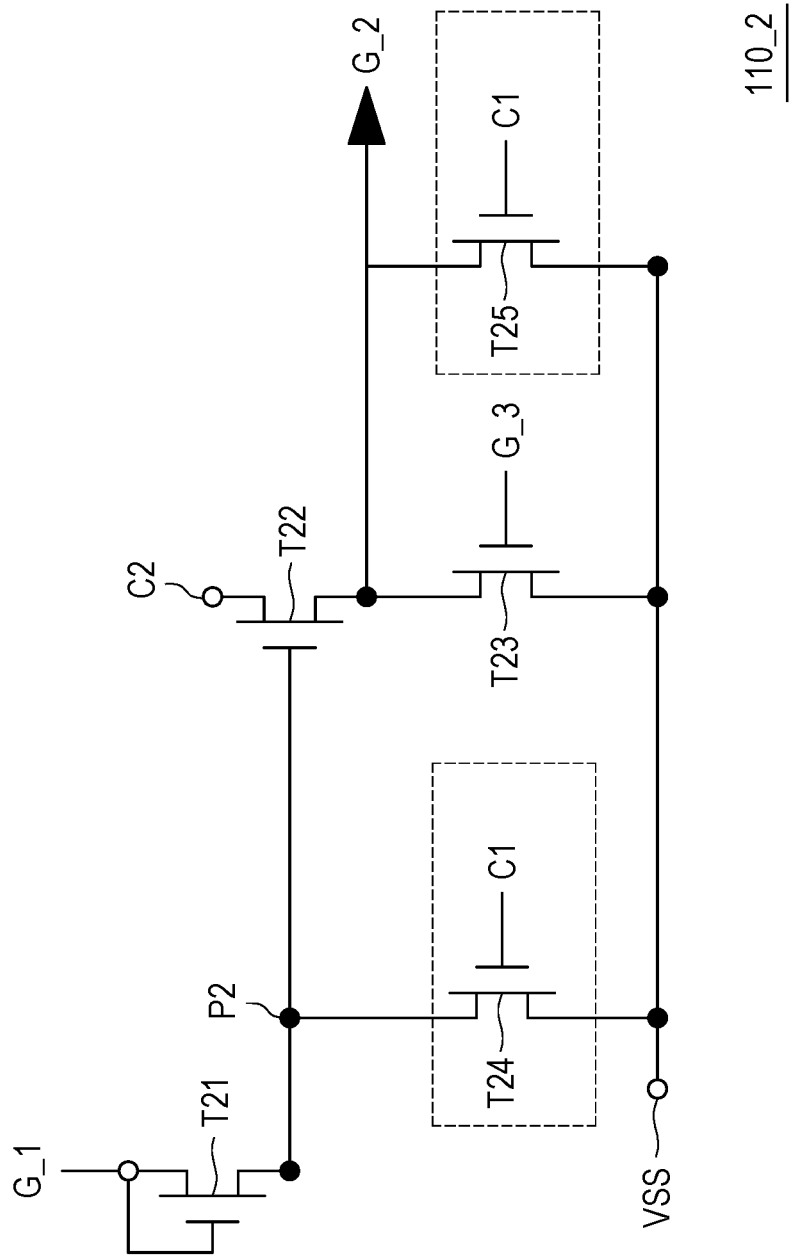
FIG. 3 is a circuit diagram of a second gate line driving circuit according to an embodiment of the disclosure.

FIG. 3 is a circuit diagram of a second gate line driving circuit according to an embodiment of the disclosure. Referring to FIG. 1 and FIG. 3, the gate line driving circuit 110_2 of FIG. 1 may include the specific circuit architecture as shown in FIG. 3. The gate line driving circuit 110_2 includes transistors T21 to T25. In the embodiment, a first terminal of the transistor T21 is coupled to the gate line G_1 and a control terminal of the transistor T21 to receive an output result of the gate line driving circuit in the previous row. A second terminal of the transistor T21 is coupled to a node P2. A first terminal of the transistor T22 (which may be used as the first transistor 111_2 of FIG. 1) is coupled to the second clock signal C2. A control terminal of the transistor T22 is coupled to the node P2. A second terminal of the transistor T22 is coupled to the gate line G_2 and a first terminal of the transistor T23. A control terminal of the transistor T23 is coupled to the gate line G_3 to receive an output result of the driving circuit in the next row. A second terminal of the transistor T23 is coupled to the first voltage VSS. A first terminal of the transistor T24 (which may be used as the second transistor 112_2 of FIG. 1) is coupled to the node P2. A control terminal of the transistor T24 is coupled to the first clock signal C1. A second terminal of the transistor T24 is coupled to the first voltage VSS. A first terminal of the transistor T25 (which may be used as the second transistor 112_2 of FIG. 1) is coupled to a second terminal of the transistor T22 and the gate line G_2. A control terminal of the transistor T25 is coupled to the first clock signal C1. A second terminal of the transistor T25 is coupled to the first voltage VSS. In an embodiment, the gate line driving circuit 110_2 may only include one of the transistor T24 and the transistor T25, which is not limited to that shown in FIG. 3.

It should be noted that the circuit architecture of the gate line driving circuits 110_3 to 110_M in the odd rows of FIG. 1 may be analogized from the circuit architecture as shown in FIG. 2, and the circuit architecture of the gate line driving circuits 110_3 to 110_M in the even rows may be analogized from the circuit architecture as shown in FIG. 3, so no more details are given here. The gate line driving circuit 110_1 (in the first row) may receive the start signal STV and the output result of the driving circuit in the next row. Each row of the gate line driving circuits 110_2 to 110_(M−1) may respectively receive the output result of the corresponding driving circuit in the previous row and the output result of the corresponding driving circuit in the next row. The gate line driving circuit 110_M (in the last row) may receive the output result of the corresponding driving circuit in the previous row.

Figure 4:
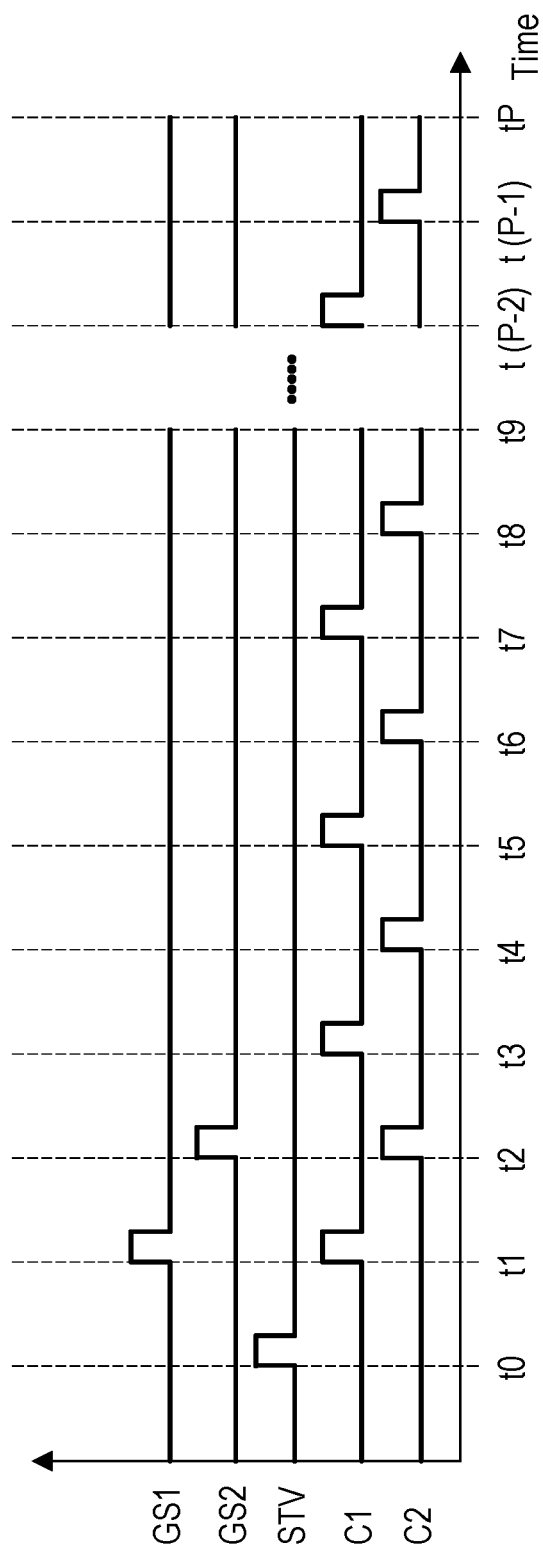
FIG. 4 is a signal clock diagram according to an embodiment of the disclosure.

FIG. 4 is a signal clock diagram according to an embodiment of the disclosure. Referring to FIG. 2 to FIG. 4, time t0 to time tp are a light detection period of a frame of the detection device, where p is a positive integer. In the embodiment, the gate line driving circuit 110_1 may receive the start signal STV, the first clock signal C1, and the second clock signal C2 as shown in FIG. 4. The gate line driving circuit 110_2 may receive a driving signal GS1, the first clock signal C1, and the second clock signal C2 as shown in FIG. 4. The first clock signal C1 and the second clock signal C2 are clock signals with different phases, so there is a phase difference between the first clock signal C1 and the second clock signal C2, so that the pulse waveforms of each other are alternately generated. The gate line driving circuit 110_1 may output the driving signal GS1 shown in FIG. 4 to the corresponding photoelectric element through the gate line G_1, and the gate line driving circuit 110_2 may output a driving signal GS2 shown in FIG. 4 to another corresponding photoelectric element through the gate line G_2, so as to respectively drive the corresponding photoelectric element and another photoelectric element for light sensing operations.

Specifically, between time t0 and time t1, the first terminal of the transistor T11 of the gate line driving circuit 110_1 may receive the start signal STV having a voltage waveform of a high voltage level to start the gate line driving circuit 110_1. Between time t1 and time tp, the start signal STV has a voltage waveform of a continuous low voltage level, but not limited thereto. Between time t1 and time t2, the first clock signal C1 has a pulse waveform of a high voltage level. At this time, since the node P1 is charged by the start signal STV having a voltage waveform of a high voltage level between time t0 and time t1, the control terminal of the transistor T12 of the gate line driving circuit 110_1 may receive the voltage signal of the high voltage level of the node P1, so that the semiconductor of the transistor T12 is conducted, and the transistor T12 is turned on. Moreover, the first terminal of the transistor T12 receives the first clock signal C1 having a pulse waveform of a high voltage level, so the second terminal of the transistor T12 may synchronously output the driving signal GS1 having a pulse waveform of a high voltage level to the gate line G_1.

Between time t2 and time t3, the second clock signal C2 has a pulse waveform of a high voltage level. At this time, the control terminals of the transistor T14 and the transistor T15 of the gate line driving circuit 110_1 receive the second clock signal C2 having a pulse waveform of a high voltage level to pull down the voltage levels of the node P1 and the gate line G_1. In this way, the semiconductor of the transistor T12 of the gate line driving circuit 110_1 is in a non-conductive state, and the transistor T12 is turned off, so as to prevent wrongly outputting a driving signal. For the gate line driving circuit 110_2, since the circuit node P2 is charged by the driving signal GS1 having a pulse waveform of a high voltage level between time t1 and time t2, the control terminal of the transistor T22 of the gate line driving circuit 110_2 may be turned on by receiving a voltage signal of a high voltage level of the node P2. Moreover, the first terminal of the transistor T22 receives the second clock signal C2 having a pulse waveform of a high voltage level, so the second terminal of the transistor T22 may synchronously output the driving signal GS2 having a pulse waveform of a high voltage level to the gate line G_2.

Between time t3 and time t4, the first clock signal C1 has a pulse waveform of a high voltage level, and the second clock signal C2 has a pulse waveform of a low voltage level. At this time, the control terminals of the transistor T24 and the transistor T25 of the gate line driving circuit 110_2 receive the first clock signal C1 having a pulse waveform of a high voltage level to pull down the voltage levels of the node P2 and the gate line G_2. In this way, the transistor T22 of the gate line driving circuit 110_2 is turned off, so as to prevent wrongly outputting a driving signal. Moreover, for the gate line driving circuit 110_1, since the voltage level of the circuit node P1 is pulled down between time t2 and time t3, the gate line driving circuit 110_1 remains in the non-conductive state. It is worth noting that the gate line driving circuits 110_3 to 110_M of FIG. 1 sequentially output driving signals between time t4 and time tp, and the specific operation timing may be deduced by analogy from the above description of the gate line driving circuit 110_1 and the gate line driving circuit 110_2.

In the embodiment, the control terminals of the transistor T14 and the transistor T15 that may be used as the second transistor 112_1 of FIG. 1 in the gate line driving circuit 110_1 and the control terminals of the transistor T24 and the transistor T25 that may be used as the second transistor 112_2 of FIG. 1 in the gate line driving circuit 110_2 are respectively coupled to the first clock signal C1 and the second clock signal C2. In other words, the transistor T14 and the transistor T15 are driven when the first clock signal C1 is at a high voltage level, and the transistor T24 and the transistor T25 are driven when the second clock signal C2 is at a high voltage level. Relatively speaking, the transistor T12 (which may be used as the first transistor 111_1 of FIG. 1) is only driven when the node P1 is at a high voltage level, and the transistor T22 (which may be used as the first transistor 111_2 of FIG. 1) is only driven when the node P2 is at a high voltage level. Therefore, the number of times and/or the time the transistor T14 and the transistor T15 are driven is higher than that of the transistor T12, and the number of times and/or the time the transistor T24 and the transistor T25 are driven is higher than that of the transistor T22. Therefore, the transistor T14 and the transistor T15 of the gate line driving circuit 110_1 and the transistor T24 and the transistor T25 of the gate line driving circuit 110_2 of the embodiment may be disposed in the X-ray irradiation area 103 as shown in FIG. 1, so that the offset of the threshold voltage of the transistor T14, the transistor T15, the transistor T24, and the transistor T25 is adjusted via X-ray irradiation. In this way, the offset of the threshold voltage of the transistor T14, the transistor T15, the transistor T24, and the transistor T25 can be improved, and the gate line driving circuit 110_1 and the gate line driving circuit 110_2 can also provide an optimal gate driving function.

Figure 5:
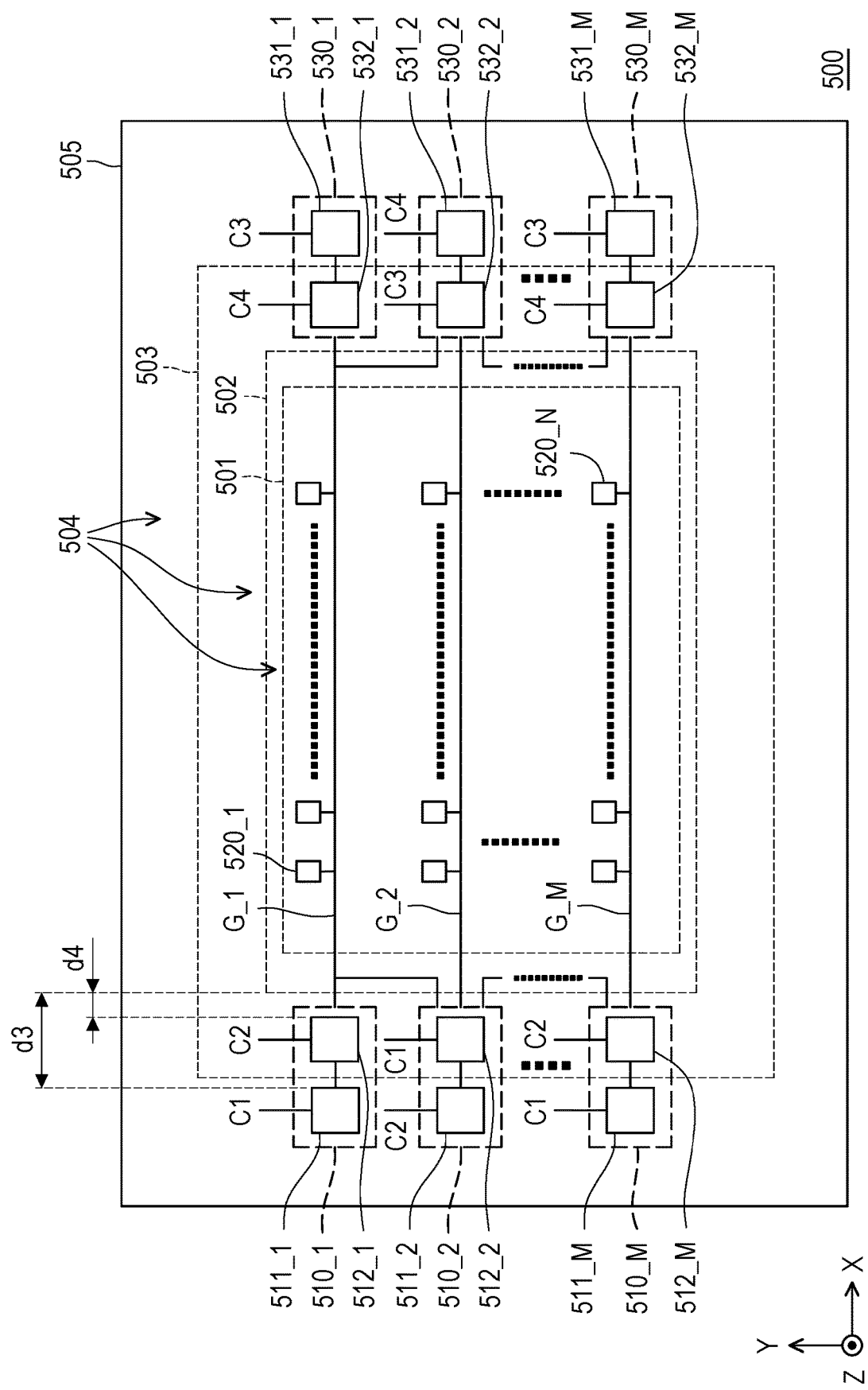
FIG. 5 is a schematic diagram of a detection device according to another embodiment of the disclosure.

FIG. 5 is a schematic diagram of a detection device according to another embodiment of the disclosure. Referring to FIG. 5, a detection device 500 includes gate lines G_1 to G_M, gate line driving circuits 510_1 to 510_M and 530_1 to 530_M, photoelectric elements 520_1 to 520_N, and a substrate 505. The substrate 505 includes a detection area 501, a scintillator layer 502, an X-ray irradiation area 503, and a peripheral area 504. The peripheral area 504 surrounds the detection area 501. The scintillator layer 502 is disposed on the photoelectric elements 520_1 to 520_N and covers the detection area 501. The range of the X-ray irradiation area 503 covers the range of the detection area 501 and the scintillator layer 502. The area of the X-ray irradiation area 503 is greater than the area of the detection area 501 and the area of the scintillator layer 502. The area of the scintillator layer 502 is greater than the area of the detection area 501. In other words, the scintillator layer 502 and the X-ray irradiation area 503 cover a part of the peripheral area 504. The peripheral area 504 is the region from the edge of the substrate 505 to the edge of the detection area 501. It is further explained that the scintillator layer 502 may receive the X-rays and generate corresponding visible light according to the X-rays, so that the corresponding photoelectric element may implement an X-ray detection function through detecting the corresponding visible light.

In the embodiment, the gate lines G_1 to G_M are disposed on the substrate 505 and extend from the detection area 501 to the peripheral area 504. The gate line driving circuits 510_1 to 510_M and 530_1 to 530_M are disposed in the peripheral area 504 of the substrate 505 and are respectively located on two opposite sides of the detection area 501, and include first transistors 511_1 to 511_M and 531_1 to 531_M and second transistors 512_1 to 512_M and 532_1 to 532_M. For example, the gate line driving circuits 510_1 to 510_M are disposed in the peripheral area 504 on the left side of the detection area 501, and the gate line driving circuits 530_1 to 530_M are disposed in the peripheral area 504 on the right side of the detection area 501, but the disclosure is not limited thereto.

In the embodiment, the gate line driving circuit 510_1 and the gate line driving circuit 530_1 are both coupled to the gate line G_1. The gate line driving circuit 510_1 is also coupled to the gate line driving circuit 510_2, and the gate line driving circuit 530_1 is also coupled to the gate line driving circuit 530_2. The gate line driving circuit 510_2 and the gate line driving circuit 530_2 are both coupled to the gate line G_2. The gate line driving circuit 510_2 is also coupled to the gate line driving circuit 510_3, and the gate line driving circuit 530_2 is also coupled to the gate line driving circuit 530_3. By analogy, the gate line driving circuit 510_(M−1) and the gate line driving circuit 530_(M−1) are both coupled to the gate line G_(M−1). The gate line driving circuit 510_(M−1) is also coupled to the gate line driving circuit 510_M, and the gate line driving circuit 530_(M−1) is also coupled to the gate line driving circuit 530_M. The gate line driving circuit 510_M and the gate line driving circuit 530_M are both coupled to the gate line G_M.

In the embodiment, the first transistors 511_1 to 511_M and 531_1 to 531_M in the gate line driving circuits 510_1 to 510_M and 530_1 to 530_M are respectively coupled to the corresponding gate lines. For example, the first transistor 511_1 of the gate line driving circuit 510_1 and the first transistor 531_1 of the gate line driving circuit 530_1 are coupled to the gate line G_1. The first transistor 511_2 of the gate line driving circuit 510_2 and the first transistor 531_2 of the gate line driving circuit 530_2 are coupled to the gate line G_2. By analogy, the first transistor 511_M of the gate line driving circuit 510_M and the first transistor 531_M of the gate line driving circuit 530_M are coupled to the gate line G_1. The first transistors 511_1 to 511_M of the gate line driving circuits 510_1 to 510_M are respectively coupled to the corresponding second transistors 512_1 to 512_M. The first transistors 531_1 to 531_M of the gate line driving circuits 530_1 to 530_M are respectively coupled to the corresponding second transistors 532_1 to 532_M.

In the embodiment, the first transistor 511_1 of the gate line driving circuit 510_1 is coupled to the first clock signal C1, and the second transistor 512_1 is coupled to the second clock signal C2. The first transistor 511_2 of the gate line driving circuit 510_2 is coupled to the second clock signal C2, and the second transistor 512_2 is coupled to the first clock signal C1. The first transistor 511_3 of the gate line driving circuit 510_3 is coupled to the first clock signal C1, and the second transistor 512_3 is coupled to the second clock signal C2. By analogy, the first transistors (the odd-numbered first transistors 511_1 to 511_M) of the gate line driving circuits 510_1 to 510_M in the odd rows may be coupled to the first clock signal C1, and the first transistors (the even-numbered first transistors 511_1 to 511_M) of the gate line driving circuits 510_1 to 510_M in the even rows may be coupled to the second clock signal C2. The second transistors (the odd-numbered second transistors 512_1 to 512_M) of the gate line driving circuits 510_1 to 510_M in the odd rows may be coupled to the second clock signal C2, and the second transistors (the even-numbered second transistors 512_1 to 512_M) of the gate line driving circuits 510_1 to 510_M in the even rows may be coupled to the first clock signal C1.

In the embodiment, the first transistor 531_1 of the gate line driving circuit 530_1 is coupled to a first clock signal C3, and the second transistor 532_1 is coupled to a second clock signal C4. The first transistor 531_2 of the gate line driving circuit 530_2 is coupled to the second clock signal C4, and the second transistor 532_2 is coupled to the first clock signal C3. The first transistor 531_3 of the gate line driving circuit 530_3 is coupled to the first clock signal C3, and the second transistor 532_3 is coupled to the second clock signal C4. By analogy, the first transistors (the odd-numbered first transistors 531_1 to 531_M) of the gate line driving circuits 530_1 to 530_M in the odd rows may be coupled to the first clock signal C3, and the first transistors (the even-numbered first transistor 531_1 to 531_M) of the gate line driving circuits 530_1 to 530_M in the even rows may be coupled to the second clock signal C4. The second transistors (the odd-numbered second transistors 532_1 to 532_M) of the gate line driving circuits 530_1 to 530_M in the odd rows may be coupled to the second clock signal C4, and the second transistors (the even-numbered second transistors 532_1 to 532_M) of the gate line driving circuits 530_1 to 530_M in the even rows may be coupled to the first clock signal C3.

In other words, the first transistors of the gate line driving circuits in the odd rows may be respectively coupled to the first clock signal C1 and the first clock signal C3, and the second transistors may be respectively coupled to the second clock signal C2 and the second clock signal C4. The first transistors of the gate line driving circuits in the even rows are respectively coupled to the second clock signal C2 and the second clock signal C4, and the second transistors are respectively coupled to the first clock signal C1 and the first clock signal C3. The second transistors are all coupled to the first transistors regardless of whether the gate line driving circuits are in the odd rows or the even rows. The photoelectric elements 520_1 to 520_N are disposed in the detection area 501. The gate line G_1 is coupled to multiple photoelectric elements. The gate line G_2 is coupled to multiple photoelectric elements. By analogy, the gate line G_M is coupled to multiple photoelectric elements.

In the embodiment, the first clock signal C1 may be equal to the first clock signal C3, and the second clock signal C2 may be equal to the second clock signal C4. However, in another embodiment, the gate line driving circuits 510_1 to 510_M may also be coupled to different gate lines from the gate line driving circuits 530_1 to 530_M. For example, the gate line driving circuit 510_1 is coupled to the gate line G_1, and the gate line driving circuit 530_1 is coupled to the gate line G_2. The gate line driving circuit 510_2 is coupled to the gate line G_3, and the gate line driving circuit 530_2 is coupled to the gate line G_4. By analogy, the gate line driving circuits 510_1 to 510_M may be coupled to the odd-numbered gate lines G_1 to G_M, and the gate line driving circuits 530_1 to 530_M may be coupled to the even-numbered gate lines G_1 to G_M. Moreover, in an embodiment, the first clock signal C1 may not be equal to the first clock signal C3, and the second clock signal C2 may not be equal to the second clock signal C4. Alternatively, in another embodiment, the first clock signal C1 may be equal to the first clock signal C3, and the second clock signal C2 may be equal to the second clock signal C4, but the disclosure is not limited thereto.

In the embodiment, viewing from the top view direction (that is, the direction Z) of the detection device 500, a distance d4 respectively between the second transistors 512_1 to 512_M and 532_1 to 532_M and the scintillator layer 502 is less than a distance d3 between the first transistors 511_1 to 511_M and 531_1 to 531_M and the scintillator layer 502. Taking the gate line driving circuit 510_1 as an example, the distance d3 and the distance d4 refer to the shortest distances from the scintillator layers 502 measured in the direction (that is, the direction X) in which the respective semiconductors of the first transistor 511_1 and the second transistor 512_1 extend along the gate line G_1. In the embodiment, the first transistors 511_1 to 511_M and 531_1 to 531_M are respectively disposed in the peripheral area 504 outside the X-ray irradiation area 503, and the second transistors 512_1 to 512_M and 532_1 to 532_M are respectively disposed in the X-ray irradiation area 503 outside the scintillator layer 502.

In the embodiment, the photoelectric elements 520_1 to 520_N may be arranged in an array in the detection area 501, but not limited thereto. The photoelectric elements 520_1 to 520_N may respectively include photodiodes, but not limited thereto. The gate line driving circuits 510_1 to 510_M and 530_1 to 530_M are respectively coupled to the photoelectric elements 520_1 to 520_N through the gate lines G_1 to G_M. In the embodiment, the gate line driving circuits 510_1 to 510_M and 530_1 to 530_M are respectively coupled to multiple photoelectric elements in different rows of the photoelectric elements 520_1 to 520_N through the gate lines G_1 to G_M. The gate line driving circuits 510_1 to 510_M and 530_1 to 530_M may drive the photoelectric elements 520_1 to 520_N through the gate lines G_1 to G_M to perform a light detection function. In the embodiment, the semiconductors of the first transistors 111_1 to 111_M and the second transistors 512_1 to 512_M and 532_1 to 532_M may each include silicon (Si) or metal oxide, such as an amorphous silicon semiconductor, a polycrystalline silicon semiconductor, or an indium gallium zinc oxide semiconductor, but not limited thereto. The materials of the semiconductors of the first transistors 111_1 to 111_M and the second transistors 112_1 to 112_M may be the same or different. In addition, the first transistors 111_1 to 111_M and the second transistors 512_1 to 512_M and 532_1 to 532_M may be disposed on the substrate 505 with gate on array technology, but not limited thereto.

It is worth noting that since the second transistors 512_1 to 512_M and 532_1 to 532_M in different rows may receive the first clock signal C1, the first clock signal C3, the second clock signal C2, and the second clock signal C4, and the number of times and/or the time the second transistors 512_1 to 512_M and 532_1 to 532_M are driven are higher than the first transistors 511_1 to 511_M and 531_1 to 531_M in the same row, the second transistors 512_1 to 512_M and 532_1 to 532_M of the embodiment are disposed in the X-ray irradiation area 503, so that the second transistors 512_1 to 512_M and 532_1 to 532_M are irradiated via X-rays, causing the threshold voltage of the second transistors 512_1 to 512_M and 532_1 to 532_M to generate, for example, a negative bias phenomenon, so as to effectively improve or overcome the offset of the threshold voltage of the second transistors 512_1 to 512_M and 532_1 to 532_M.

In summary, in the detection device of the disclosure, the transistor for high-speed switching may be disposed in the region on the substrate that may be irradiated by the X-rays, so as to effectively compensate the voltage offset phenomenon of the threshold voltage of the transistor caused by long-time high-speed switching, so that the electrical signal transmitted in the detection device can remain normal. In this way, the reliability and the durability of the detection device of the disclosure can be effectively improved, and a stable and effective light detection function can be provided.

Finally, it should be noted that the above embodiments are only used to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

What is claimed is:
1. A detection device, comprising:
  a substrate, comprising a detection area and a peripheral area surrounding the detection area;
  a gate line, disposed on the substrate and extending from the detection area to the peripheral area;
  a gate line driving circuit, disposed in the peripheral area of the substrate and comprising a first transistor and a second transistor, wherein the first transistor is coupled to a first clock signal and the gate line, and the second transistor is coupled to a second clock signal and the first transistor; and a photoelectric element, disposed in the detection area and coupled to the gate line,
wherein viewing from a top view direction of the detection device, a distance between the second transistor and the detection area is less than a distance between the first transistor and the detection area.

2. The detection device according to claim 1, further comprising:
an X-ray irradiation area, wherein an area of the X-ray irradiation area is greater than the detection area, and the second transistor is disposed in the X-ray irradiation area outside the detection area.

3. The detection device according to claim 2, wherein the first transistor is disposed in the peripheral area outside the X-ray irradiation area.

4. The detection device according to claim 1, further comprising:
a scintillator layer, disposed on the photoelectric element, wherein viewing from a top view direction of the detection device, the scintillator layer covers the detection area,
wherein an area of the scintillator layer is greater than an area of the detection area.

5. The detection device according to claim 4, wherein a distance between the second transistor and the scintillator layer is less than a distance between the first transistor and the scintillator layer.

6. The detection device according to claim 4, wherein the second transistor is disposed in the peripheral area outside the scintillator layer.

7. The detection device according to claim 1, wherein the first clock signal and the second clock signal are clock signals with different phases.

8. The detection device according to claim 1, wherein a first terminal of the first transistor is coupled to the first clock signal, and a second terminal of the first transistor is coupled to the gate line,
wherein a first terminal of the second transistor is coupled to the second terminal of the first transistor, a second terminal of the second transistor is coupled to a first voltage, and a control terminal of the second transistor is coupled to the second clock signal.

9. The detection device according to claim 8, wherein the gate line driving circuit further comprises another second transistor, a first terminal of the another second transistor is coupled to a control terminal of the first transistor, a second terminal of the another second transistor is coupled to the first voltage, and a control terminal of the another second transistor is coupled to the second clock signal.

10. The detection device according to claim 8, wherein the gate line driving circuit further comprises a third transistor, wherein the third transistor is coupled to the first transistor and the second transistor.

11. The detection device according to claim 10, wherein a control terminal of the third transistor is coupled to another gate line.

12. The detection device according to claim 8, wherein the gate line driving circuit further comprises a fourth transistor, wherein the fourth transistor is coupled to a control terminal of the first transistor.

13. The detection device according to claim 12, wherein a first terminal of the fourth transistor is coupled to a control terminal of the fourth transistor.

14. The detection device according to claim 12, wherein a first terminal of the fourth transistor is coupled to a start signal.

15. The detection device according to claim 12, wherein a first terminal of the fourth transistor is coupled to another gate line.

16. The detection device according to claim 1, wherein a first terminal of the first transistor is coupled to the first clock signal, and a second terminal of the first transistor is coupled to the gate line,
wherein a first terminal of the second transistor is coupled to a control terminal of the first transistor, a second terminal of the second transistor is coupled to a first voltage, and a control terminal of the second transistor is coupled to the second clock signal.

17. The detection device according to claim 1, wherein pulse waveforms of the first clock signal and the second clock signal are alternately generated.

18. The detection device according to claim 1, wherein time the first transistor is driven is higher than time the second transistor is driven.

19. The detection device according to claim 1, wherein a number of times the first transistor is driven is higher than a number of times the second transistor is driven.

20. The detection device according to claim 1, further comprising:
another gate line, disposed on the substrate and extending from the detection area to the peripheral area; and
another gate line driving circuit, disposed in the peripheral area of the substrate and comprising another first transistor and another second transistor, wherein the another first transistor is coupled to the second clock signal and the another gate line, and the another second transistor is coupled to the first clock signal and the another first transistor.

* * * * *